(12) United States Patent
Johnson et al.

(10) Patent No.: US 7,950,838 B2
(45) Date of Patent: May 31, 2011

(54) LIGHT DIRECTING FILM (75) Inventors: Todd M. Johnson, St. Paul, MN (US);
Tetsuya Toma, Woodbury, MN (US);
Patrick H. Marushin, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 820 days.

(21) Appl. No.: 11/421,342

(22) Filed: May 31, 2006

(65) Prior Publication Data
US 2007/0279773 A1 Dec. 6, 2007

(51) Int. Cl.
*F21V 7/04* (2006.01)

(52) U.S. Cl. ......... 362/620; 362/626; 359/599; 349/112

(58) Field of Classification Search .................. 359/599; 362/617, 618, 620, 627; 349/57, 64, 95, 349/112
See application file for complete search history.

(56) References Cited

U.S. PATENT DOCUMENTS

| | | | |
|---|---|---|---|
| 4,906,070 A | 3/1990 | Cobb | |
| 5,056,892 A | 10/1991 | Cobb | |
| 5,280,371 A | 1/1994 | McCartney et al. | |
| 5,771,328 A | 6/1998 | Wortman et al. | |
| 6,356,389 B1 | 3/2002 | Nilsen et al. | |
| 6,854,855 B2 * | 2/2005 | Munro et al. | 362/620 |
| 7,178,966 B2 * | 2/2007 | Yu et al. | 362/626 |
| 2002/0044351 A1 | 4/2002 | Nilsen | |
| 2004/0239822 A1 | 12/2004 | Kamijima et al. | |
| 2005/0094295 A1 | 5/2005 | Yamashita et al. | |
| 2006/0256582 A1* | 11/2006 | Chuang | 362/620 |

* cited by examiner

*Primary Examiner* — Alessandro Amari
(74) *Attorney, Agent, or Firm* — Robert S. Moshrefzadeh (57) ABSTRACT A light directing film and an optical system incorporating same are disclosed. The light directing film includes a first major surface and a microstructured second major surface. The microstructured second major surface has at least two periodic microstructured patterns. The first periodic pattern is arranged along a first direction. The second periodic pattern is arranged along a second direction different from the first direction.

7 Claims, 13 Drawing Sheets

LIGHT DIRECTING FILM

FIELD OF THE INVENTION

This invention generally relates to light directing films and displays incorporating same. In particular, the invention relates to light directing films having at least two periodic microstructured patterns along different directions.

BACKGROUND

Liquid crystal displays (LCDs) often incorporate one or more periodic microstructured films to enhance display brightness along a pre-determined direction, typically, where a user is expected to be located. The periodic microstructured film typically includes a periodic array of linear prisms. In some applications, a single prismatic film is used, while in others two crossed prismatic films are employed, in which case, the two crossed prismatic films are often oriented normal to each other.

The periodic pattern of a prismatic film employed in an LCD can optically interfere with the periodic pattern of the pixelated liquid crystal panel resulting in an undesirable moiré pattern that degrades a displayed image.

SUMMARY OF THE INVENTION

Generally, the present invention relates to light directing films. The present invention also relates to light directing films employed in display systems.

In some embodiments, a light directing film includes a first major surface and a microstructured second major surface. The microstructured second major surface has at least two periodic microstructured patterns. The first periodic pattern is arranged along a first direction and has a first period. The second periodic pattern is arranged along a second direction and has a second period. The second direction is different from the first direction.

In some embodiments, a light directing film includes a first major surface and a second major surface. The second major surface has a two-dimensional microstructured pattern that is superimposed on a one-dimensional periodic microstructured pattern.

In some embodiments, a light directing film includes a first major surface and a second major surface. The second major surface has a one-dimensional periodic microstructured pattern. The second major surface further includes a two-dimensional regularly-spaced pattern of discrete elements that are disposed on the one-dimensional periodic microstructured pattern.

BRIEF DESCRIPTION OF DRAWINGS

The invention may be more completely understood and appreciated in consideration of the following detailed description of various embodiments of the invention in connection with the accompanying drawings, in which like reference numbers designate like parts, and wherein.

DETAILED DESCRIPTION

The present invention generally relates to light directing films that include two or more periodic microstructured patterns. The invention is further applicable to liquid crystal displays employing at least one light directing film where it is desirable to reduce or minimize moiré effects that can result from optical interference between the periodic patterns of the light directing film and the liquid crystal panel, and/or where it is desirable to minimize optical coupling between the light directing film and a planar optical film that may be located in close proximity to the light directing film.

Figure 1:
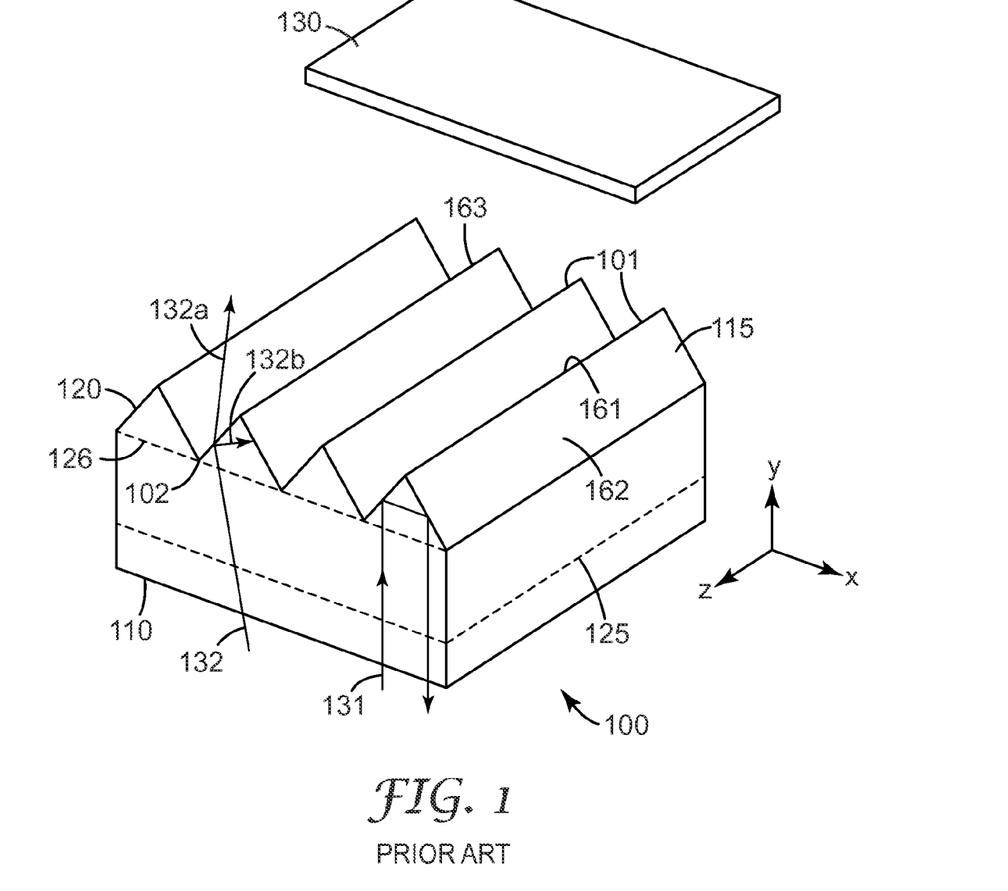
FIG. 1 is a three-dimensional schematic view of a conventional light directing film.

FIG. 1 is a schematic three-dimensional view of a conventional prismatic light directing film 100. Films similar to film 100 have been previously disclosed, for example, in U.S. Pat. Nos. 4,906,070 (Cobb) and 5,056,892 (Cobb). Film 100 has a first major surface 110 and a microstructured second major surface 120. Film 100 further includes a plurality of linear prisms 115 each of which has two side surfaces, such as surfaces 161, 162, and 163, and extends linearly along the z-axis. Film 100 has a prismatic cross-section in the xy-plane. Film 100 further has a plurality of peaks 101 and grooves 102. Peaks 101 have a same height as measured from a common reference plane, such as plane 125 or 126, placed somewhere between first and second major surfaces 110 and 120, respectively. For an equal height prism structure, the peaks of all the linear prisms lie in a same plane, meaning that a planar film 130 brought into contact with light directing film 100, contacts all the peaks of the linear prisms of film 100.

The operation of conventional light directing film 100 has been previously described, for example, in U.S. Pat. No. 5,056,892 (Cobb). In summary, a light ray, such as ray 131, that strikes surfaces 161 or 162 at incident angles larger than the critical angle are totally internally reflected back. On the other hand, a light ray, such as ray 132 that is incident on a side surface, such as surface 163, at angles less than the critical angle is partly transmitted (such as ray 132a) and partly reflected (such as ray 132b). An end result is that when employed in a display, such as a liquid crystal display, light directing film 100 can result in display brightness enhancement by redirecting light and by recycling light that is totally internally reflected.

Figure 2:
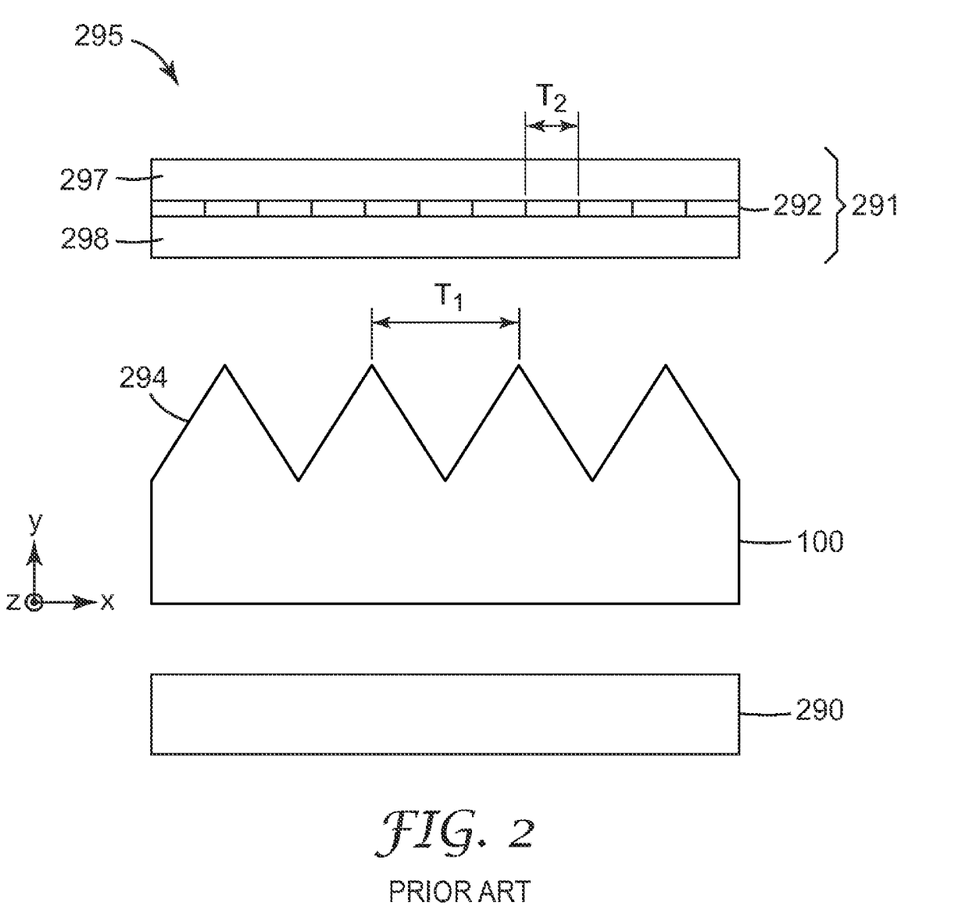
FIG. 2 is a schematic side-view of a liquid crystal display that includes a conventional light directing film.

FIG. 2 is a schematic side-view of a liquid crystal display 295 that includes a conventional light directing film. For ease of illustration and without loss of generality, FIG. 2 only shows a few exemplary components in a typical liquid crystal display. In particular, liquid crystal display 295 includes a liquid crystal panel 291, light directing film 100, and a light guide 290. Light directing film 100 has a periodic pattern 294 with pitch $T_1$.

Liquid crystal panel 291 includes a periodic pattern 292 due to, for example, liquid crystal pixels and/or color filter patterning. Periodic pattern 292 is disposed between components 297 and 298, where components 297 and 298 can, for example, be glass sheets. Liquid crystal panel 291 typically includes other components, not shown in FIG. 2, such as thin film transistors, transparent conductive electrodes, and polarizers. The periodic pattern 292 has a pitch $T_2$.

The overlapping of periodic patterns 292 and 294 results in a moiré pattern that is essentially an interference pattern between the two periodic patterns. Although the moiré effect has many practical uses such as in metrology, the effect can be undesirable in other applications particularly in liquid crystal displays where the moiré pattern can interfere with easy viewing of a displayed image and reduce resolution, contrast, and in general, quality of the image. As described below in detail, the present application discloses light directing films that have multiple periodic patterns resulting in multiple moiré patterns with the aggregate pattern being less visible.

Figure 3:
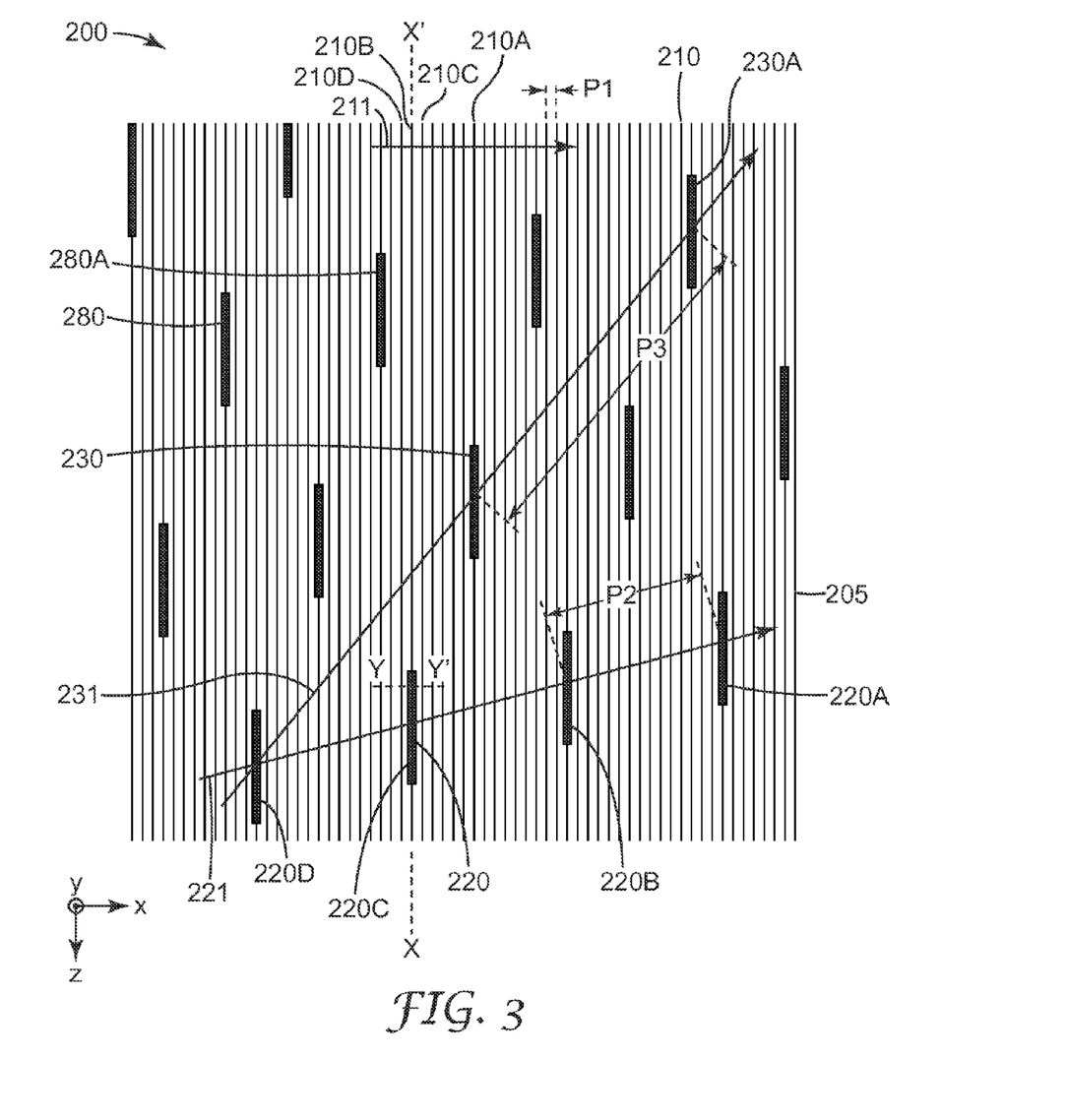
FIG. 3 is a schematic top-view of a light directing film.

FIG. 3 is a schematic top-view of an exemplary light directing film 200. Light directing film 200 has a major microstructured surface 205 that has at least two periodic microstructured patterns. In particular, major surface 205 includes a periodic microstructured pattern 210 arranged along direction 211 with a period P1, where direction 211 is along the x-axis. Exemplary microstructures included in periodic microstructured pattern 210 are microstructures 210A, 210B, 210C, and 210D. Major surface 205 further includes a periodic microstructured pattern 220 arranged along direction 221 with a period P2, where direction 221 is different from direction 211. Exemplary microstructures included in periodic microstructured pattern 220 are microstructures 220A, 220B, 220C, and 220D. In some applications, periods P1 and P2 are different. In some other applications, the two periods are equal.

Period P1 can, in general, be any value. In some applications, period P1 is in a range from about 1,000 microns to about 10,000 microns. In some other applications, P1 is in a range from about 1 micron to about 200 microns. In some other applications, P1 is in a range from about 10 microns to about 100 microns.

Major surface 205 further includes a periodic microstructured pattern 230 arranged along direction 231 with a period P3, where direction 231 is different from directions 211 and 221. An exemplary microstructure included in periodic microstructured pattern 230 is microstructure 230A. In some applications, periods P1, P2, and P3 are different. In some other applications, some of the periods in the periodic patterns may be equal and some other periods may be different.

In the exemplary embodiment shown in FIG. 3, a microstructure may be included in more than one periodic pattern. For example, microstructure 220D is included in both periodic patterns 220 and 230. It can readily be appreciated from FIG. 3 that major microstructured surface 205 includes other periodic patterns not explicitly described herein.

Microstructured major surface 205 can also be described as having a two-dimensional microstructured pattern 280 superimposed on a one-dimensional periodic microstructured pattern 210. In the exemplary embodiment shown in FIG. 3, the two-dimensional microstructured pattern is periodic along at least one direction, such as directions 221 and 231. In general, pattern 280 can be aperiodic. In some applications, pattern 280 can have a chirped periodicity along a direction, meaning that the period changes in a predetermined way, for example linearly, along the direction.

In the embodiment of FIG. 3, the two-dimensional microstructured pattern 280 is periodic and includes a two-dimensional array of regularly spaced microstructures such as microstructures 220A, 220D, 230A, and 280A arranged in the xz-plane. The one-dimensional periodic pattern 210 includes a linear array of regularly spaced microstructures such as microstructures 210A and 210D arranged in the xz-plane.

Figure 4A:
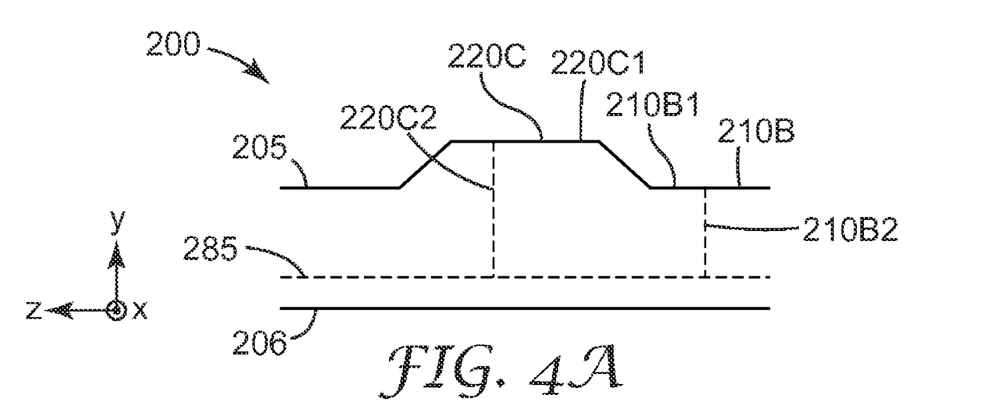
FIGS. 4A and 4B are exemplary cross-sectional profiles of light directing films.

FIG. 4A illustrates a schematic cross-sectional view of light directing film 200, in particular of microstructures 220C and 210B, where the cross-section is taken along direction XX' in FIG. 3. Light directing film 200 has a major surface 206 and a microstructured major surface 205. Each microstructure in major surface 205 of light directing film 200 has a peak and a peak height measured from the peak to a common reference plane 285 disposed between major surfaces 205 and 206. For example, microstructure 210B has a peak 210B1 and an associated peak height 210B2. Similarly, microstructure 220C has a peak 220C1 and an associated peak height 220C2. In general, peak heights of microstructures in different periodic patterns may or may not be equal. For example, in the exemplary embodiment shown in FIG. 4A, peak height 220C2 is greater than peak height 210B2. In the exemplary embodiment shown in FIG. 4B, peak height 220C2 is smaller than peak height 210B2.

Figure 4B:
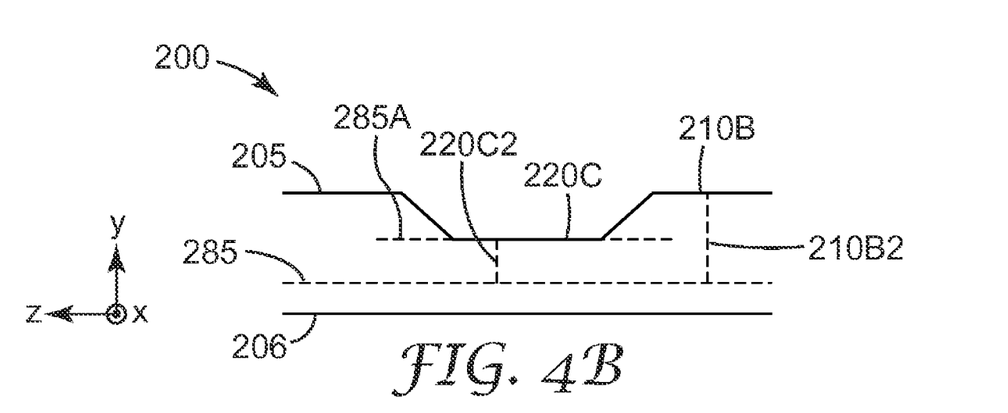

In general, peak heights 220C2 and 210B2 can be any value. In some applications, peak heights 220C2 and 210B2 are no greater than 1,000 microns, where for the purposes of discussing peak heights, common reference plane 285 is chosen as the plane closest to structured surface 205, such as plane 285A. In some applications, peak heights 220C2 and 210B2 are no greater than 100 microns, or no greater than 50 microns.

In general, the difference between peak heights 220C2 and 210B2 can be any value. In some applications, the difference between peak heights 220C2 and 210B2 is no greater than 1,000 microns. In some applications, the difference is no greater than 100 microns, or no greater than 10 microns.

Figure 5A:
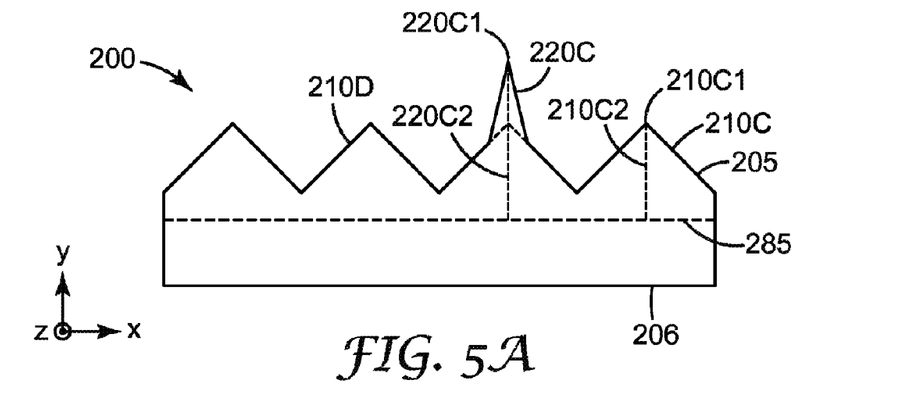
FIGS. 5A-5C are exemplary cross-sectional profiles of light directing films.

FIG. 5A illustrates a schematic cross-sectional view of light directing film 200, in particular, of microstructures 220C, 210C, and 210D where the cross-section is taken along direction YY' in FIG. 3. Prismatic microstructure 220C is part of the periodic pattern 220 shown in FIG. 3 and prismatic microstructures 210C and 210D are part of the periodic pattern 210 shown in FIG. 3. Microstructure 220C has a peak 220C1 and a peak height 220C2 relative to common reference plane 285. Similarly, microstructure 210C has a peak 210C1 and an associated peak height 210C2 where peak height 220C2 is greater than peak height 210C2. In the exemplary embodiment shown in FIG. 5B, structure 220C has two peaks 220C1 each having peak height 220C2 where peak height 220C2 is smaller than peak height 210C2.

Figure 5B:
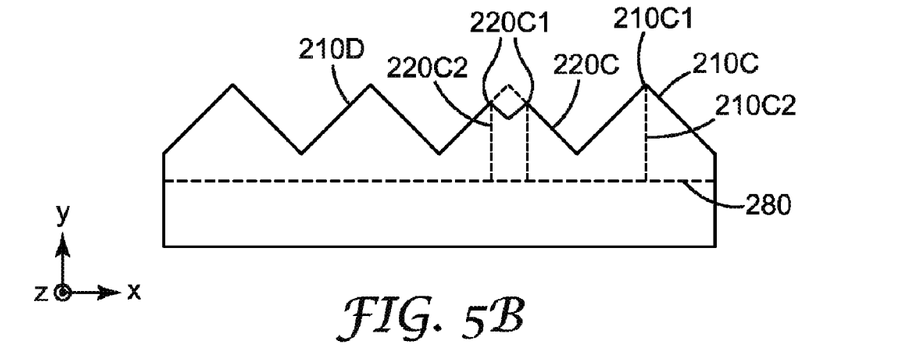

In the exemplary embodiments shown in FIGS. 5A and 5B, microstructure 220C partially modifies microstructure 210B across the length of microstructure 220C along the z-axis. In the exemplary embodiment shown in FIG. 5C, microstructure 220C effectively replaces microstructure 210B along the length of microstructure 220C.

Figure 5C:
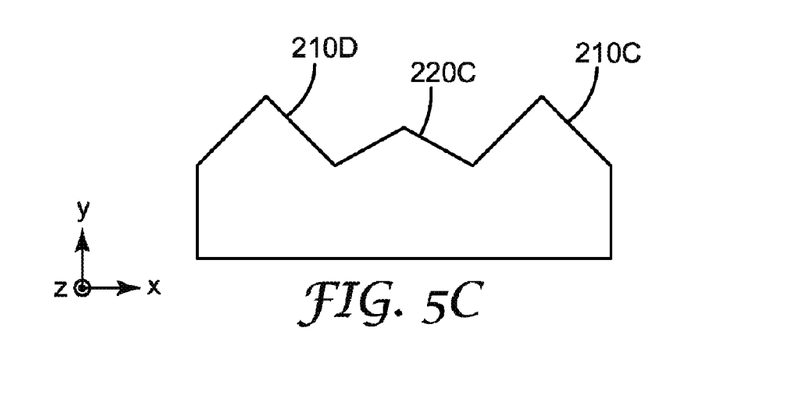

In the exemplary embodiments shown in FIGS. 5A-5C, microstructure 220C is symmetrically positioned relative to microstructures 210C and 210D. In general, microstructures of pattern 280 can be placed anywhere on major surface 205. In particular, in some applications, two-dimensional microstructured pattern 280 can be positioned asymmetrically relative to one-dimensional periodic microstructured pattern 210.

Figure 6A:
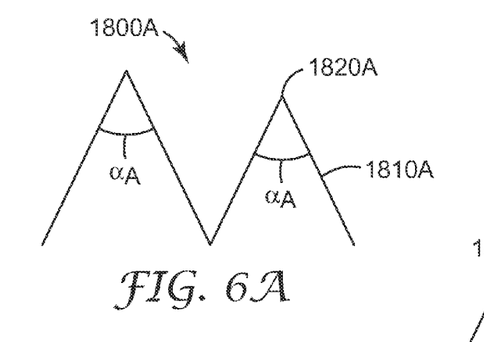
FIGS. 6A-6E are exemplary cross-sectional profiles of microstructures.
Figure 6B:
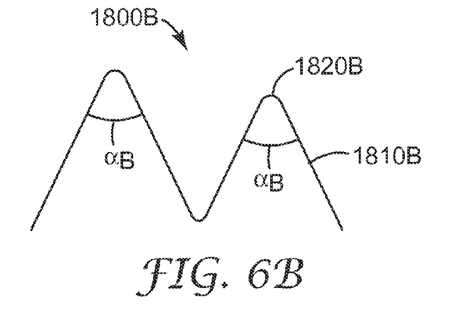
Figure 6C:
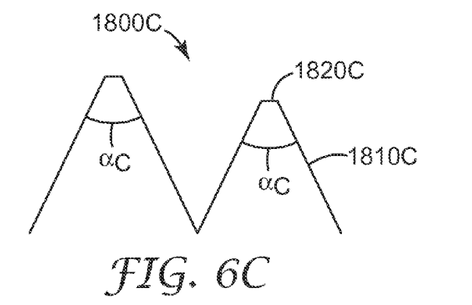
Figure 6D:
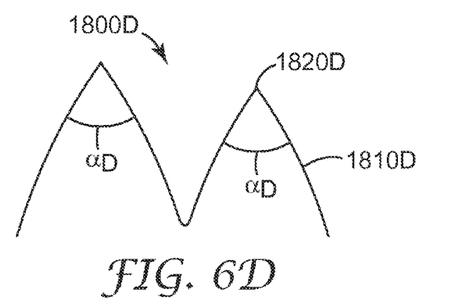
Figure 6E:
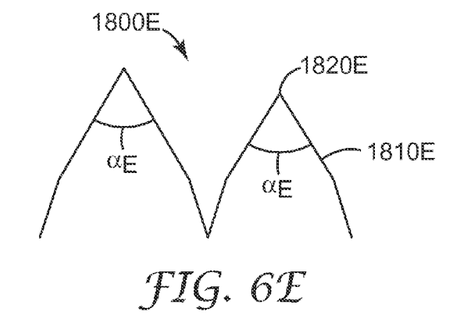

The exemplary microstructures shown in FIG. 5A are prismatic having triangular profiles. In general, light directing film 200 can include any shape microstructure that is capable of directing light. Exemplary microstructures having different profiles are shown in FIGS. 6A-6E. In FIG. 6A, extended prisms 1800A have straight sides 1810A, sharp peaks 1820A, sharp grooves, and peak angle $\alpha_A$, similar to the prisms of FIG. 5A. Prisms 1800B in FIG. 6B have straight sides 1810B, round peaks 1820B, round grooves, and peak angles $\alpha_B$. The radius of curvature of the peak or the groove can, for example, be in the range from about 1 to 100 microns. In FIG. 6C, prisms 1800C have straight sides 1810C, flat peaks 1820C, sharp grooves, and peak angle $\alpha_C$. As a further example, prisms 1800D in FIG. 6D have curved sides 1810D, sharp peaks 1820D, round grooves, and peak angle $\alpha_D$. As yet another example, prisms 1800E in FIG. 6E have piece-wise linear sides 1810E, sharp peaks 1820E, sharp grooves, and peak angle $\alpha_E$.

Figure 7:
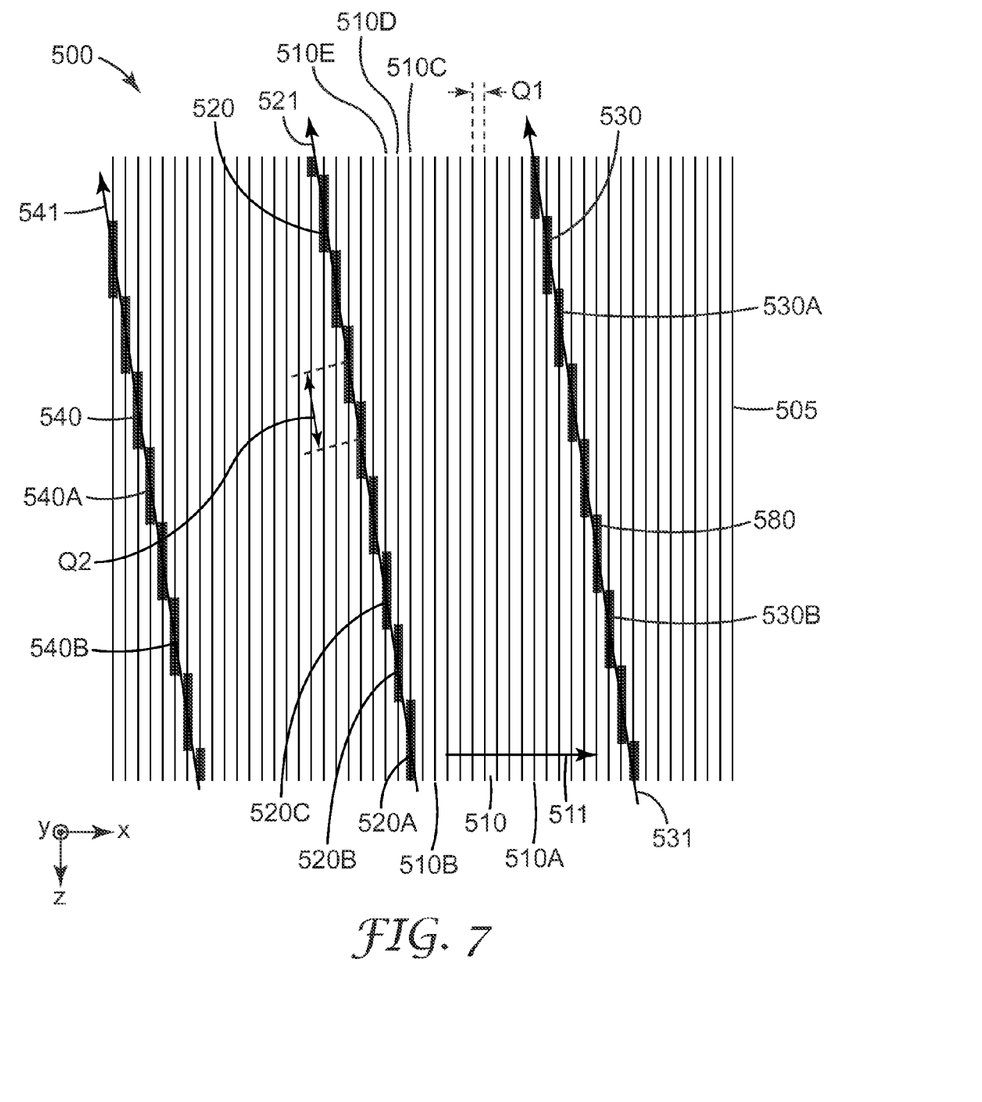
FIG. 7 is a schematic top-view of a light directing film in accordance with one embodiment of the invention.

FIG. 7 is a schematic top-view of another light directing film 500. Light directing film 500 has a microstructured major surface 505 that has at least two periodic microstructured patterns. In particular, major surface 505 includes a periodic microstructured pattern 510 arranged along direction 511 with a period Q1, where direction 511 is along the x-axis. Exemplary microstructures included in periodic microstructured pattern 510 are microstructures 510A, 510B, 510C, 510D, and 510E. Major surface 505 further includes a periodic microstructured pattern 520 arranged along direction 521 with a period Q2, where direction 521 is different from direction 511. Exemplary microstructures included in periodic microstructured pattern 520 are microstructures 520A, 520B, and 520C. In some applications, periods Q1 and Q2 are different. In some other applications, Q1 and Q2 are equal.

Major surface 505 further includes a periodic microstructured pattern 530 arranged along direction 531 where direction 531 is parallel to direction 521. Exemplary microstructures included in periodic microstructured pattern 530 are microstructures 530A and 530B. Major surface 505 further includes a periodic microstructured pattern 540 arranged along direction 541 where direction 541 is parallel to directions 521 and 531. Exemplary microstructures included in periodic microstructured pattern 540 are microstructures 540A and 540B.

Microstructured major surface 505 can be viewed as having a two-dimensional microstructured pattern 580 superimposed on a one-dimensional periodic microstructured pattern 510. The two-dimensional microstructured pattern 580 is periodic and includes a two-dimensional array of regularly spaced microstructures such as microstructures 520A, 530A, and 540A arranged in the xz-plane. The one-dimensional periodic pattern 510 includes a linear array of regularly spaced microstructures such as microstructures 510A and 510E arranged in the xz-plane.

Figure 8:
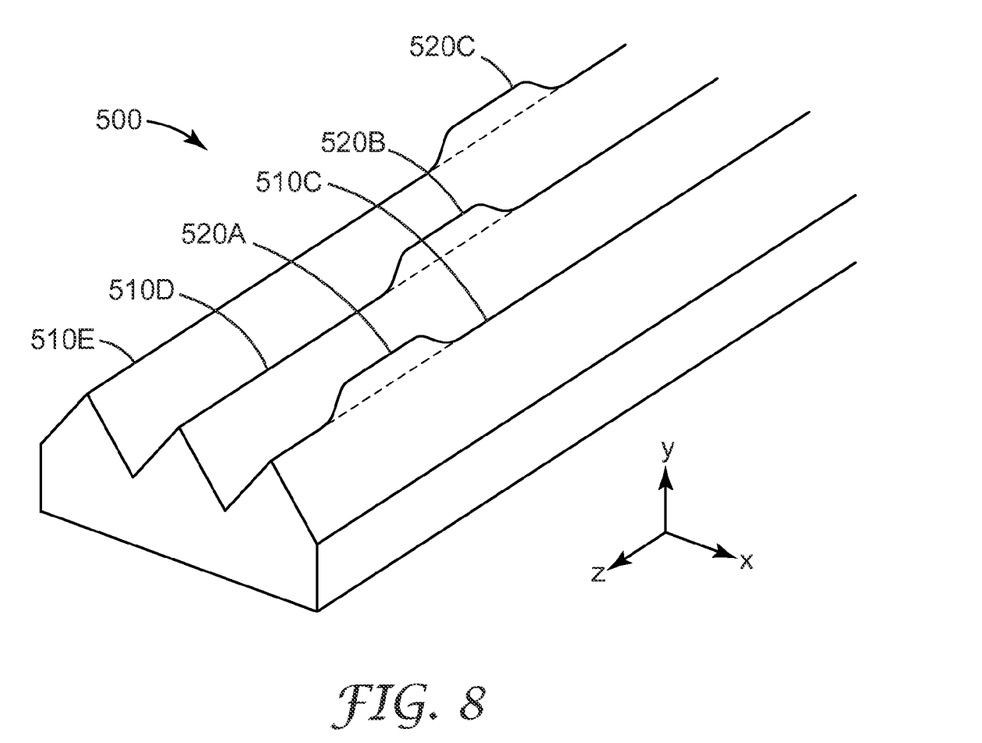
FIG. 8 is a three-dimensional schematic view of another light directing film.

FIG. 8 is a schematic three-dimensional view of a portion of light directing film 500 of FIG. 7. In particular, FIG. 8 shows prismatic microstructures 510C, 510D, and 510E that are included in periodic pattern 510 and are linearly extended along the z-axis. FIG. 8 also shows microstructures 520A, 520B, and 520C that are included in periodic pattern 520 or two-dimensional periodic pattern 580 where pattern 580 is superimposed on pattern 510.

In the exemplary embodiment shown in FIG. 8, the microstructures belonging to periodic pattern 580 are taller than the microstructures belonging to periodic pattern 510. In some applications, the microstructures belonging to periodic pattern 580 are shorter than the microstructures belonging to periodic pattern 510.

Furthermore, in the exemplary embodiment shown in FIG. 8, the height of a microstructure is constant. In general, the height of a microstructure can vary with position, for example, with position along the z-axis. For example, the height of microstructure 510C can vary along the z-axis even in areas where microstructure 510C is not superimposed by another microstructure such as microstructure 520A.

Figure 9:
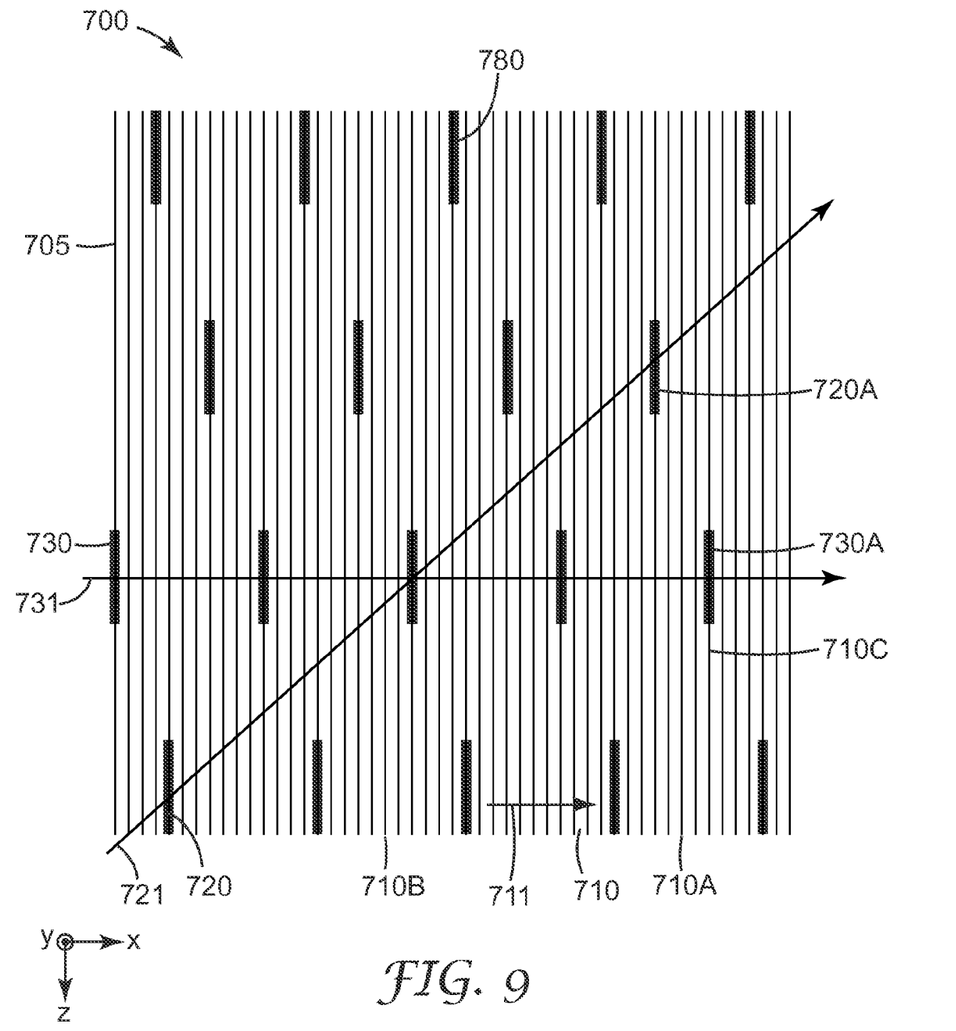
FIG. 9 is a schematic top-view of a light directing film.

FIG. 9 is a schematic top-view of another light directing film 700. Light directing film 700 has a microstructured major surface 705 that includes a two-dimensional microstructured pattern 780 superimposed on a one-dimensional periodic microstructured pattern 710. In some embodiments, two-dimensional microstructured pattern 780 is periodic along at least one direction, such as direction 721. In some applications, two-dimensional microstructured pattern 780 is periodic along at least two different directions, such as directions 721 and 731.

In the exemplary embodiment shown in FIG. 9, two-dimensional periodic microstructured pattern 780 includes a two-dimensional array of regularly-spaced microstructures such as microstructures 720A and 730A arranged in the xz-plane. The one-dimensional periodic pattern 710 includes a linear array of regularly spaced microstructures, such as microstructures 710A and 710B, that are arranged in the xz-plane along direction 711 with each linear microstructure extending along the z-axis.

The two-dimensional periodic microstructured pattern 780 includes a plurality of periodic patterns, where each pattern is arranged along a direction. For example, two-dimensional periodic microstructured pattern 780 includes a periodic microstructured pattern 720 arranged along direction 721 where direction 721 is different from direction 711. An exemplary microstructure included in periodic microstructured pattern 720 is microstructure 720A. As another example, two-dimensional periodic microstructured pattern 780 includes a periodic microstructured pattern 730 arranged along direction 731 where direction 731 is parallel to direction 711. An exemplary microstructure included in periodic microstructured pattern 730 is microstructure 730A.

Each microstructure in the one-dimensional periodic pattern 710 and two-dimensional pattern 780 has a peak and an associated peak height. In some cases, the heights of the microstructures in the one-dimensional periodic microstructured pattern are different than the heights of the microstructures in the two-dimensional microstructured pattern. In some cases, at least two microstructures in two-dimensional microstructured pattern 780 have different heights.

The microstructures in two-dimensional microstructured pattern 780 may or may not have the same shape. In some cases, at least two microstructures in the two-dimensional microstructured pattern have different shapes. For example, microstructure 720A can have a rectangular cross-sectional profile in the xy-plane and microstructure 730A can have a triangular cross-sectional profile in the xy-plane.

FIG. 9 illustrates a light directing film 700 having a first major surface 704 (see FIG. 9A) and a second major surface 705. Second major surface 705 includes a one-dimensional periodic microstructured pattern 710. Second major surface 705 further includes a two-dimensional regularly-spaced pattern of discrete elements, such as discrete elements 720A and 730A, disposed on the one-dimensional periodic microstructured pattern 710. The discrete elements can be formed on pattern 710 by, for example, screen printing, ink-jet printing, photolithography, or any other method that may be appropriate for forming the two-dimensional array of discrete elements 780 on pattern 710.

Figure 9A:
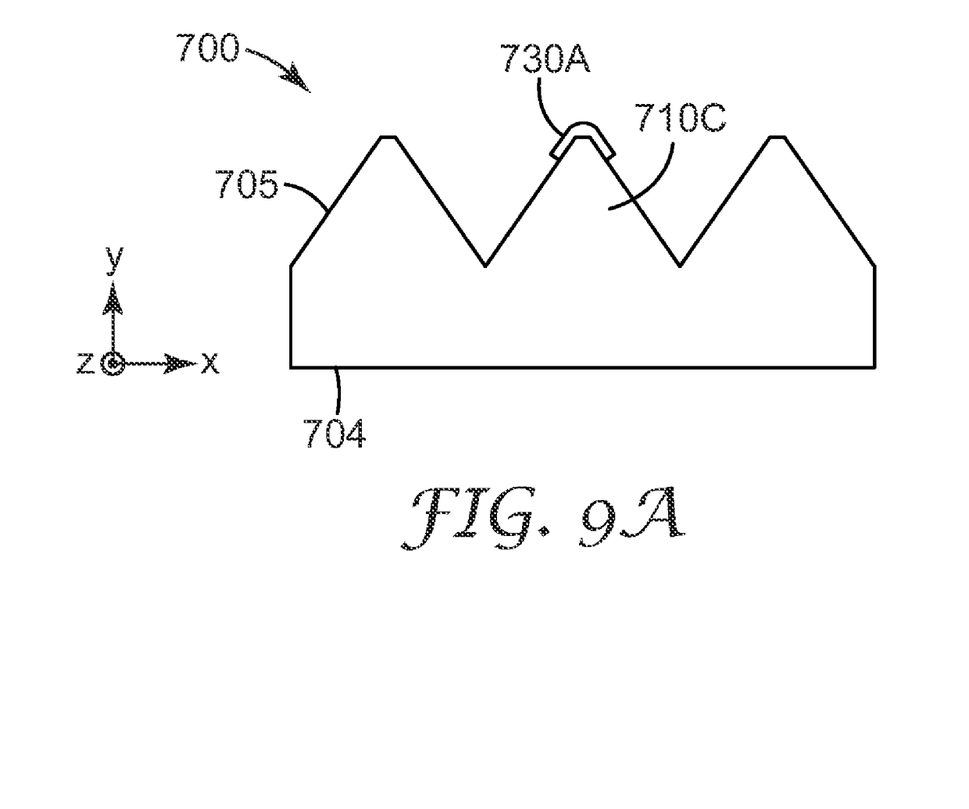
FIGS. 9A and 9B are exemplary cross-sectional profiles of light directing films.
Figure 9B:
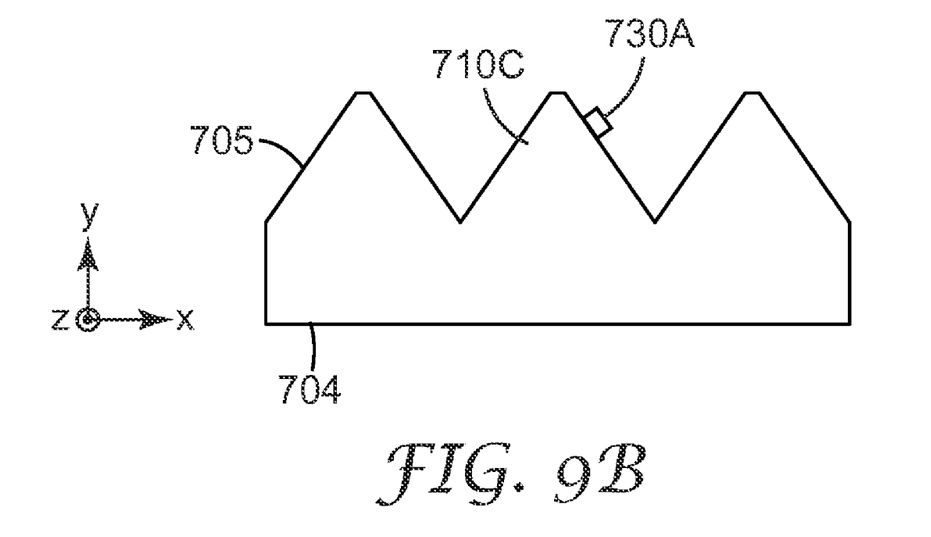

FIG. 9A illustrates a schematic cross-sectional view of light directing film 700 along direction 731 in the xy-plane. In particular, FIG. 9A shows discrete element 730A from the two-dimensional array of discrete elements 780 disposed on prismatic microstructure 710C from the one-dimensional periodic microstructured pattern 710. Element 730A can be a coating conformally formed on microstructure 710C by, for example, ink-jet printing. In the exemplary embodiment shown in FIG. 9A, element 730A covers the top or peak of microstructure 710C. In general, element 730A can be formed any where on microstructure 710C, such as on a side of microstructure 710C as shown schematically in FIG. 9B.

Figure 10:
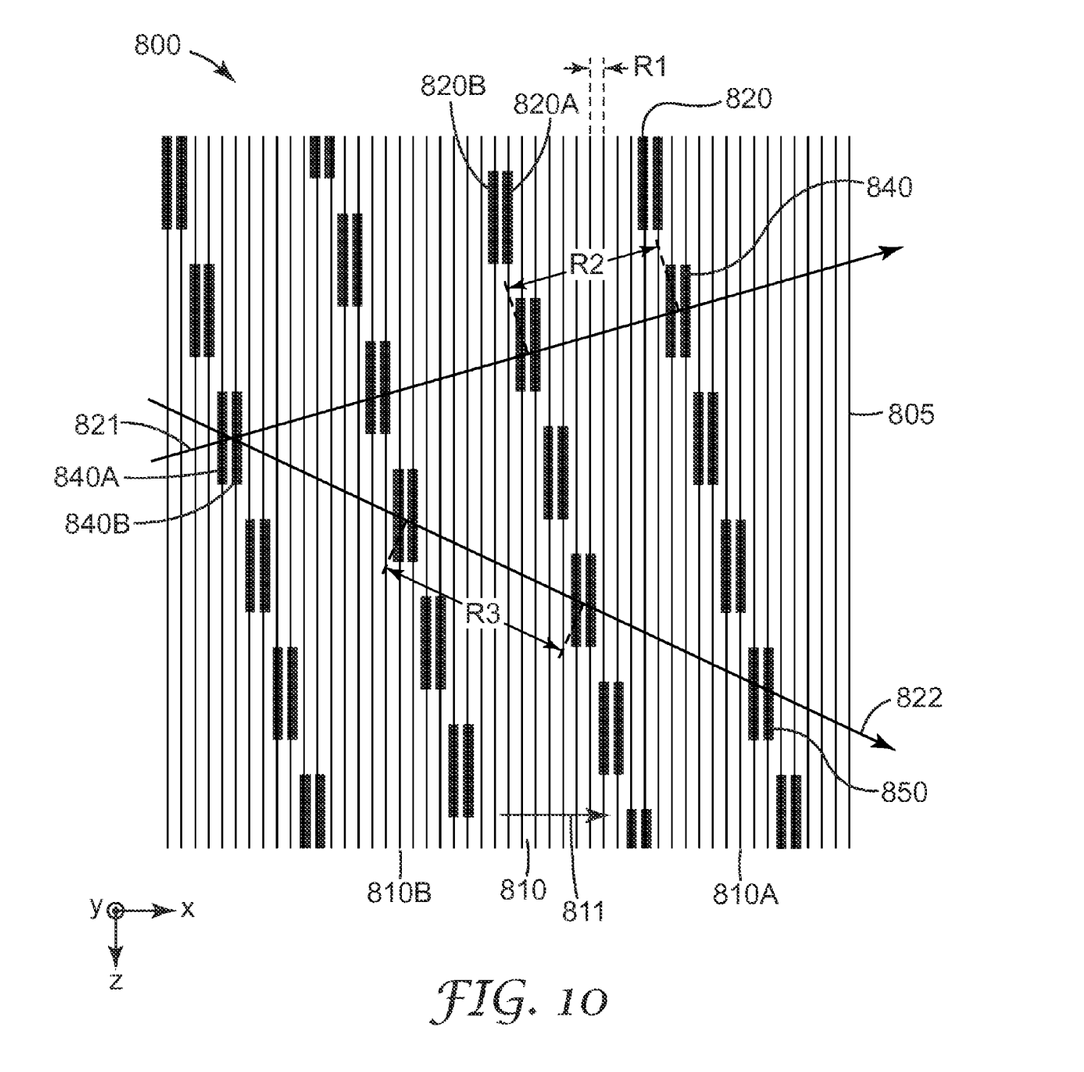
FIG. 10 is a schematic top-view of a light directing film.

FIG. 10 is a schematic top view of another light directing film 800. Light directing film 800 has a microstructured major surface 805 that includes a two-dimensional periodic microstructured pattern 820 superimposed on a one-dimensional periodic microstructured pattern 810. The two-dimensional periodic microstructured pattern 820 includes a two-dimensional array of regularly-spaced microstructures, such as microstructures 820A and 820B, arranged in the xz-plane. The one-dimensional periodic pattern 810 has a period R1 and includes a linear array of regularly-spaced microstructures, such as microstructures 810A and 810B, that are arranged in the xz-plane along direction 811 with each linear microstructure extending along the z-axis.

The two-dimensional periodic microstructured pattern 820 includes a plurality of periodic patterns, where each pattern is arranged along a direction. For example, two-dimensional periodic microstructured pattern 820 includes a periodic microstructured pattern 840 arranged along direction 821 with a period R2 where direction 821 is different from direction 811. Exemplary microstructures included in periodic microstructured pattern 840 are microstructures 840A and 840B. As another example, two-dimensional periodic microstructured pattern 820 includes a periodic microstructured pattern 850 arranged along direction 822 with period R3 where direction 822 is different from directions 811 and 821.

Figure 11:
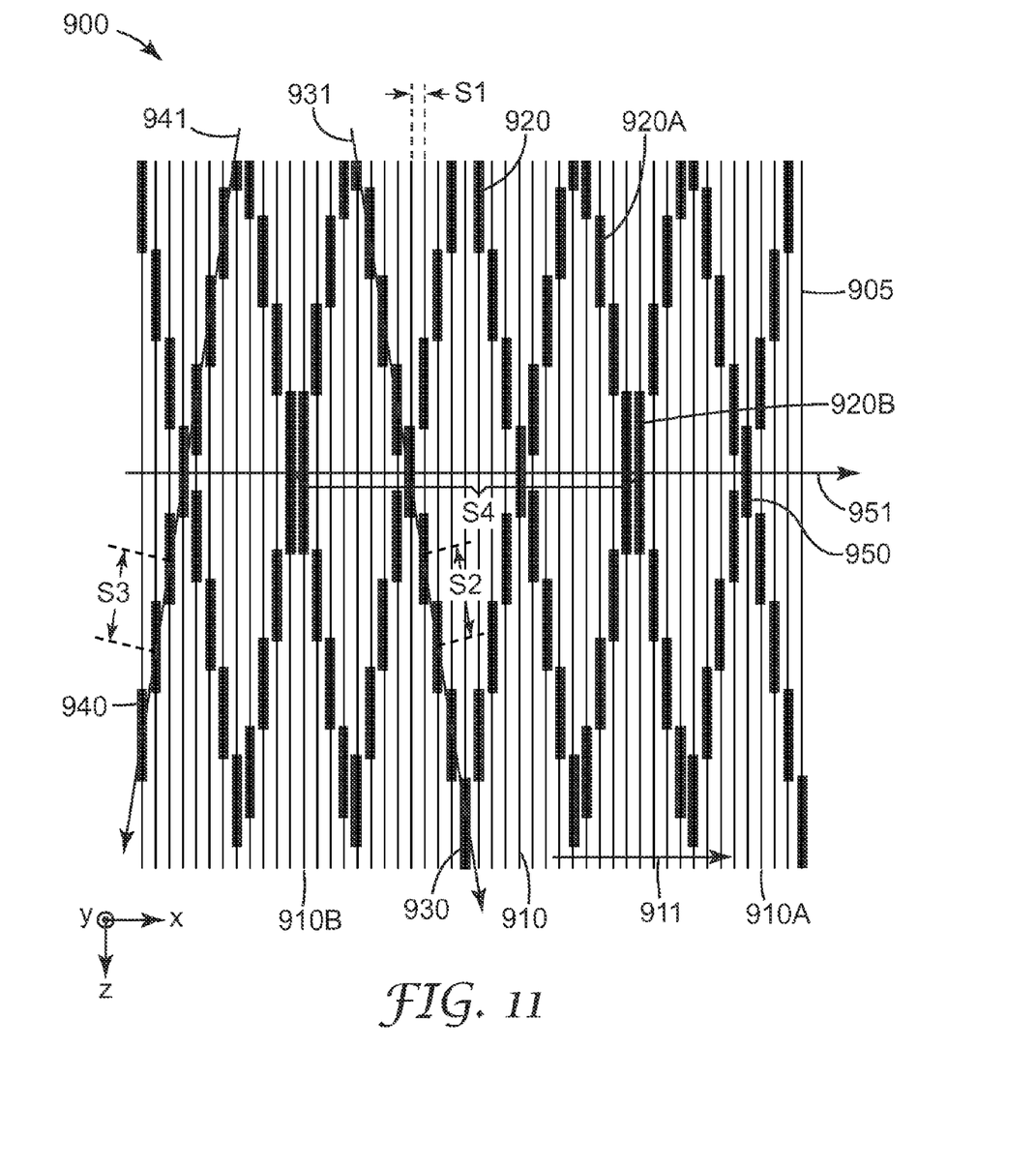
FIG. 11 is a schematic top-view of a light directing film.

FIG. 11 is a schematic top-view of another light directing film 900. Light directing film 900 has a microstructured major surface 905 that includes a two-dimensional microstructured pattern 920 superimposed on a one-dimensional periodic microstructured pattern 910. The two-dimensional microstructured pattern 920 includes a two-dimensional array of microstructures, such as microstructures 920A and 920B, arranged in the xz-plane. The one-dimensional periodic pattern 910 has a period S1 and includes a linear array of regularly-spaced microstructures, such as microstructures 910A and 910B, that are arranged in the xz-plane along direction 911 with each linear microstructure extending along the z-axis.

The two-dimensional microstructured pattern 920 includes one or more periodic microstructured patterns, where each pattern is arranged along a direction. For example, two-dimensional microstructured pattern 920 includes a periodic microstructured pattern 930 arranged along direction 931 with a period S2 where direction 931 is different from direction 911. As another example, two-dimensional periodic microstructured pattern 920 includes a periodic microstructured pattern 940 arranged along direction 941 with period S3 where direction 941 is different from directions 931 and 911. As yet another example, two-dimensional microstructured pattern 920 includes a periodic microstructured pattern 950 arranged along direction 951 with a period S4 where direction 951 is parallel to direction 911.

Figure 12:
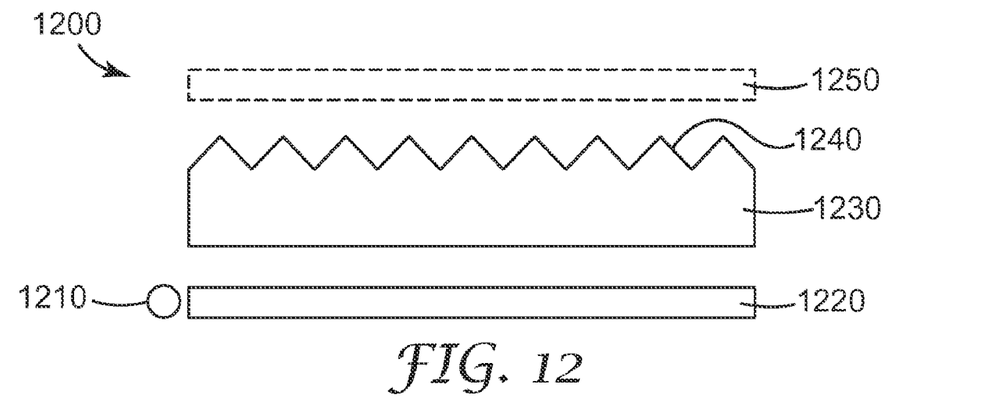
FIG. 12 is a schematic side-view of a light guide assembly.

FIG. 12 shows a schematic side-view of another light guide assembly 1200. Light guide assembly 1200 can be used in any liquid crystal device for displaying information. Light guide assembly 1200 includes a light source 1210, a light guide 1220, and a light directing film 1230 where light directing film 1230 is a light directing film according to any of the disclosed embodiments. Although microstructured surface 1240 of film 1230 in FIG. 12 is shown to face away from light guide 1220, in some applications, microstructured surface 1240 can face light guide 1220. Light guide assembly 1200 can further include an optional film 1250, similar to film 1240, but oriented differently. For example, direction of extended prisms in films 1250 and 1240 can be orthogonal to one another. Light guide assembly 1200 can further include additional films or components not explicitly shown in FIG. 12, such as reflectors, diffusers such as diffuser plates, reflective polarizers, protective films, mounting frames, or shading frames such as masks.

Figure 13:
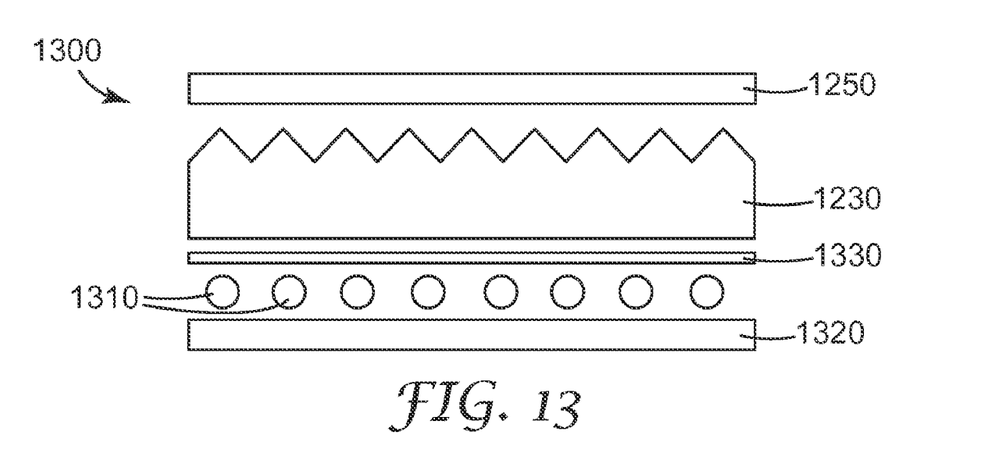
FIG. 13 is a schematic side-view of an illumination assembly.

FIG. 13 shows a schematic side-view of an illumination assembly 1300. Illumination assembly 1300 can, for example, be used in any liquid crystal device for displaying information, such as an LCD television. Illumination assembly 1300 includes a back reflector 1320, a diffuser sheet or plate 1330, and a plurality of light sources 1310 positioned between back reflector 1320 and diffuser 1330. Back reflector 1320 may be a diffuse reflector.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. A light directing film, comprising:
   a first major surface; and
   a microstructured second major surface comprising a plurality of linear prisms extending along a third direction different than first and second directions, the microstructured second major surface having at least two periodic microstructured patterns, a first of the at least two periodic microstructured patterns being arranged along a first direction with a first period, a second of the at least two periodic microstructured patterns being arranged along a second direction with a second period, the second direction being different from the first direction.

2. The light directing film of claim 1, wherein all microstructures in the first and second periodic patterns extend along a third direction, the third direction being different from the first and second directions.

3. The light directing film of claim 1, wherein at least one microstructure in each of the first and second periodic patterns has a prismatic profile.

4. The light directing film of claim 1, wherein the second of the at least two periodic microstructured patterns forms a two-dimensional periodic pattern.

5. The light directing film of claim 1, wherein each microstructure in the first and second periodic microstructured patterns has a peak and a peak height measured from the peak to a common reference plane disposed between the first and second major surfaces, and wherein the height of at least one microstructure in the first periodic pattern is different from the height of at least one microstructure in the second periodic pattern.

6. The light directing film of claim 1, further comprising a third of the at least two periodic microstructured patterns arranged along a third direction with a third period, the third direction being different from the first and second directions.

7. A light guide assembly for use in a liquid crystal display, the light guide assembly comprising at least one light directing film of claim 1.

* * * * *